United States Patent
Hasegawa et al.

[15] 3,693,151
[45] Sept. 19, 1972

[54] INITIALLY INTERMITTENTLY FLASHING BRAKE LAMP CIRCUIT

[72] Inventors: Tatsuo Hasegawa, Okazaki; Ikuya Kobayashi, Toyota, both of Japan

[73] Assignee: Toyota Jidosha Kogyo Kabushiki Kaisha, Toyota, Aichi Prefecture, Japan

[22] Filed: April 14, 1971

[21] Appl. No.: 134,061

Related U.S. Application Data

[63] Continuation of Ser. No. 796,791, Feb. 5, 1969, abandoned.

[30] Foreign Application Priority Data

Feb. 7, 1968    Japan ..........................43/7634

[52] U.S. Cl. ..................340/72, 317/141, 317/148.5
[51] Int. Cl. ..............................................B60q 1/44
[58] Field of Search.........................................340/72

[56] References Cited

UNITED STATES PATENTS

| | | |
|---|---|---|
| 1,885,714 | 11/1952 | Hampton...............340/342 X |
| 3,487,358 | 12/1969 | Ubukata et al...........340/81 F |
| 3,504,338 | 3/1970 | Breece.....................340/82 X |

FOREIGN PATENTS OR APPLICATIONS

| | | |
|---|---|---|
| 883,164 | 7/1953 | Germany.....................340/81 |
| 831,510 | 3/1960 | Great Britain...............340/81 |

*Primary Examiner*—Kenneth N. Leimer
*Attorney*—Connolly and Hutz

[57] ABSTRACT

Brake lamp circuit in automobile or other vehicle comprises brake lamps and brake lamp switch operated by depressing brake pedal. Both are connected in series to power source. Time relay is connected between brake lamp switch and brake lamps, and flasher unit is connected between time relay and brake lamps. Time relay and flasher function to cause brake lamps to flash intermittently for a predetermined period of time after and while the brake pedal of vehicle is depressed.

2 Claims, 3 Drawing Figures

3,693,151

INITIALLY INTERMITTENTLY FLASHING BRAKE LAMP CIRCUIT

CROSS-REFERENCE TO RELATED APPLICATION

This application is a continuation of application Ser. No. 796,791, filed Feb. 5, 1969, now abandoned.

BACKGROUND OF THE INVENTION

The present invention relates to a brake lamp circuit for automobiles and other vehicles, and more particularly to a circuit for intermittently energizing brake lamps for a predetermined time after and while the brake pedal of the vehicle is depressed.

The conventional and universal brake lamp circuit is a circuit which connects in series a brake lamp switch operated by brake pedal action, brake lamps and a power source. When braking is started, brake pedal action energizes the brake lamps to thereby indicate the braked condition. Usually, tail lamps having double filament bulbs serve concurrently as brake lamps. In nighttime driving, the tail lamps are always energized and when the brake pedal is depressed the luminous intensity of the lamps is increased. Often, the succeeding driver fails to recognize the increased luminous intensity of the tail lamps. Thus, conventional brake lamp circuits cause great fatigue and hazard for a night driver following a car with such brake lamps.

The primary object of the present invention is to provide an initially intermittently flashing brake lamp circuit in which a separate circuit is formed to connect a time relay and a flasher unit. The brake lamp power supply circuit is not affected by any failure of the time relay or the flasher unit in performing the duty of displaying the braked condition.

SUMMARY OF THE INVENTION

In accordance with the present invention a brake lamp circuit consists of a brake pedal action-operated brake lamp switch and brake lamps, both connected in series with a power source. An initially intermittently flashing brake lamp circuit includes a time relay connected between the brake lamp switch and the brake lamps. Also, a flasher unit is connected between the time relay and the brake lamps. A normally closed contact is operated by excitation or a magnet coil of the flasher unit and the normally closed contact is connected in series with the brake lamp power supply circuit. A separate circuit from the power supply circuit is provided between the time relay and the flasher unit, and the action of the time relay in the separate circuit causes the formation of a current-passing circuit to the flasher unit for a predetermined time when the brake lamp switch is closed. This causes the normally closed contact of the flasher unit to be operated to flash the brake lamps intermittently. The cessation of the action of the time relay causes the flasher unit to halt its action and restore the closed condition of the normally closed contact of the flasher unit connected in series with the brake lamp circuit to thereby continuously energize the brake lamps while the brake pedal is depressed.

BRIEF DESCRIPTION OF THE DRAWING

Novel features and advantages of the present invention in addition to those mentioned above will become apparent to one skilled in the art from a reading of the following detailed description in conjunction with the accompanying drawing wherein.

DETAILED DESCRIPTION OF THE INVENTION

Figure 1:
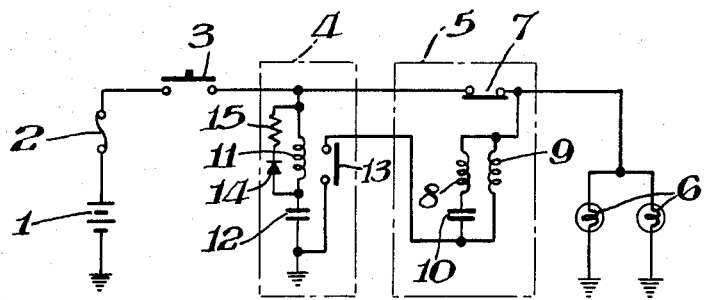
FIG. 1 is a circuit diagram of one embodiment of the present invention.
Figure 2:
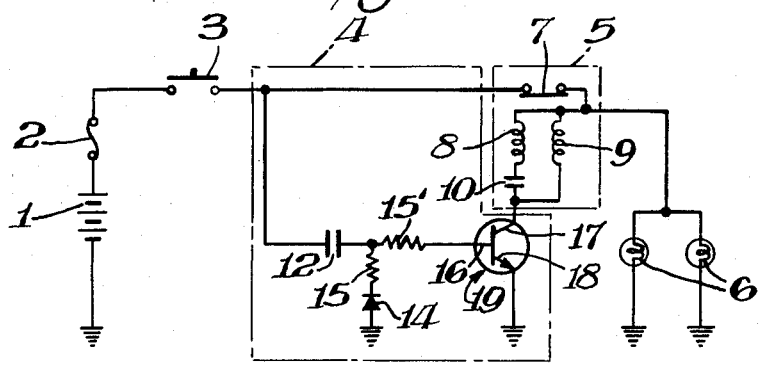
FIG. 2 is a circuit diagram of another embodiment of the present invention.
Figure 3:
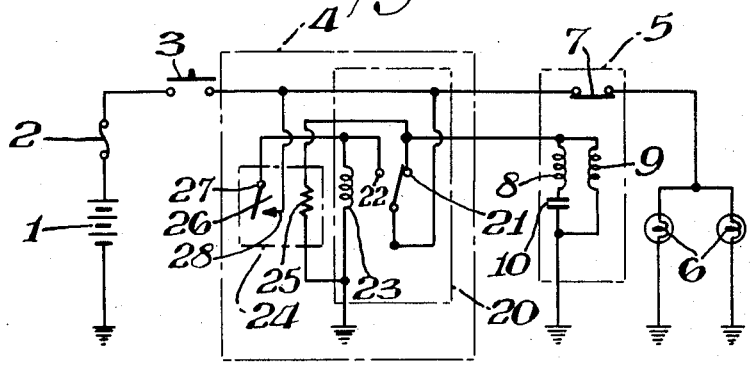
FIG. 3 is a circuit diagram of still another embodiment of the present invention.

The embodiments of this invention illustrated in FIGS. 1–3 are circuits which connect a brake pedal action-operated brake lamp switch 3, a time relay 4 and a flasher unit 5 in series between a battery 1 and brake lamps 6. The flasher unit is a condenser type unit of voltage type flashing rate of which is independent of the current load.

Referring in more particularity to the embodiment of FIG. 1, 1 is a battery, 2 is a fuse, 3 is a brake lamp switch mechanically operated by brake pedal action, 4 is a time relay, 5 is a flasher unit, and 6 are brake lamps. In the time relay 4 which is the essential element of this embodiment, 11 is a magnet coil, 12 is a condenser, and 13 is a normally open contact. A diode 14 and a resistor 15 are connected in parallel to the magnet coil 11. The normally open contact 13 is switched from its opened to closed position through excitation of the magnet coil 11, and when closed, it forms a grounded circuit of the flasher unit 5. The closing duration of the normally open contact 13, i.e., a predetermined brake lamp intermittently flashing time is controlled by the exciting current of the magnet coil 11 which depends upon the electrostatic capacity of the condenser 12 and the resistance of the magnet coil 11 (for example, the flashing time may be set at 1–2 seconds). The diode 14 and the resistor 15 connected in parallel to the magnet coil 11 are provided to accelerate the discharge from the condenser 12.

Concerning the flasher unit 5 inserted between the time relay 4 and the brake lamps 6, a normally closed contact 7 is inserted in the circuit between the time relay 4 and the brake lamps 6. The normally closed contact 7 is operated through excitation of the magnet coils 8, 9 and the condenser 10. One terminal of the magnet coils 8, 9 is connected to the circuit between the normally closed contact 7 and the brake lamps 6. The other terminal of the coil 9 and the terminal of the condenser 10 are connected to the ungrounded terminal of the normally open contact 13 of the time relay 4. Thus, the flasher unit 5 and the time relay 4 form a different circuit from the circuit between the battery 1 and the brake lamps 6.

To explain the function of the above-mentioned circuit, the brake pedal action closes the brake lamp switch 3 to energize the brake lamps 6. At the same time, the magnet coil 11 of the time relay 4 is excited to close the normally open contact 13. As a result of the normally open contact 13 being closed, the grounded circuit of the flasher unit 5 is formed to start the action of the flasher unit 5.

To explain the function of the voltage type flasher unit 5, the charged current in the condenser 10 flows into the magnet coil 8 of the flasher unit 5 via the channel of battery 1, fuse 2, brake lamp switch 3, normally closed contact 7, magnet coil 8, condenser 10, normally open contact 13 which has been closed, and the ground, to excite the magnet coil 8. The current flows into the magnet coil 9 via the channel of battery 1, fuse 2, brake lamp switch 3, normally closed contact 7, magnet coil 9, normally open contact 13 which has been closed, and the ground, to excite the magnet coil 9. The electromagnetic forces of the magnet coils 8, 9 are designed to be opposite in polarity and therefore cancel each other and cannot attract the movable part of the normally closed contact 7. However, since the exciting current in the magnet coil 8 diminishes with progress of the charge into the condenser 10, the electromagnetic force of the coil 8 also diminishes and in consequence its difference from the electromagnetic force of the magnet coil 9 increases until that difference is sufficient to attract the movable part of the normally closed contact 7 thereby opening the normally closed contact 7 and deenergizing the brake lamps 6. At the same time as the opening of the normally closed contact 7, the magnet coils 8, 9 are cut off from the battery and cease to receive the current from the latter, but the electric charge accumulated in the condenser 10 begins to be discharged as soon as the contact 7 is opened. Thus, a discharge current flows via the channel of condenser 10, magnet coil 8, brake lamps 6, ground, normally open contact 13 and condenser 10, to excite the magnet coil 8 thereby continuing to attract the movable part of the contact 7 and accordingly keeping the brake lamps 6 out. (As mentioned above, the discharge current flows in the brake lamps 6, but on account of a large resistance of the magnet coil 8, the discharge current is so small that it cannot energize the brake lamps 6.)

Meanwhile, a discharge circuit is also formed by the condenser 10, the magnet coil 8, the magnet coil 9, and the condenser 10, and in consequence the current flows in the magnet coil 9. The electromagnetic force of the coil 9 has the same polarity as that of the force due to the discharge current of the coil 8 and helps the attraction of the movable part of the normally closed contact 7. However, since the resistance of the magnet coil 9 is vastly larger than that of the bulb filaments in the brake lamps 6 the discharge current flowing in the magnet coil 9 is far less than the discharge current flowing in the circuit of the brake lamps 6. Next, as the discharge from the condenser 10 through the above mentioned discharge circuit progresses, the discharge current diminishes and accordingly the electromagnetic forces of the magnet coil 8 and the magnet coil 9 also decline until they become too weak to keep attracting the movable part of the normally closed contact 7 and hold the contact 7 in the open condition thereby restoring the closed condition of the normally closed contact 7 and in consequence again energizing the brake lamps 6.

The action of the flasher unit 5 described above is continued while the normally open contact 13 of the time relay 4 remains in closed condition. Meanwhile, the above-mentioned predetermined brake lamp intermittantly flashing time (for instance, 1–2 seconds) depends upon the resistance of the magnet coil 11 of time relay 4 and on the electrostatic capacity of the condenser 12. Therefore, you have only to set appropriate values of the resistance of the magnet coil 11 and the electrostatic capacity of the condenser 12. After the lapse of the predetermined time, for example, 1–2 seconds, with progress of the charge into the condenser 12 of the time relay 4 the current in the magnet coil 11 of the time relay 4 decreases and the coil 11 loses the power to attract and hold the normally open contact 13, as the result restoring the open condition of the normally open contact 13. The opening of the normally closed contact 13 restores the closed condition of the normally closed contact 7 of the flasher unit 5. Thus, so long as the brake lamp switch 3 is closed by brake pedal action, the brake lamps 6 can be kept on. After the opening of the normally open contact 13 of the time relay 4, the electric charge in the condenser 12 is positively and quickly discharged via the discharge circuit of the magnet coil, diode 14 and resistor 15 connected in parallel to the magnet coil 11, normally closed contact 7 of flasher unit 5, brake lamps 6, ground, and grounded terminal of condenser 12. Thus, the brake lamps 6 can be reliably flashed intermittently when again the brake pedal action closes the brake lamp switch 3.

Referring to FIG. 2, this embodiment of the present invention is a variation of the first embodiment of the time relay 4 which is essential to the invented circuit. In the time relay 4, 12 is a condenser and 15' is a resistor. Between the condenser 12 and the resistor 15' there are connected and grounded a resistor 15 and a diode 14. An npn type transistor 19 is provided in which 16 is a base, 17 is a collector and 18 is an emitter. The terminal of the collector 17 is connected to the terminal of a condenser 10 of flasher unit 5 and also to the terminal of a magnet coil 9. In the same manner as the first embodiment, the condenser 12 and the resistor 15' in the time relay 4 cause the brake lamps 6 to flash intermittently for a predetermined time (for instance, 1–2 seconds) by presetting the electrostatic capacity and the resistance.

To describe the function of the circuit mentioned above, at first brake pedal action closes the brake lamp switch 3 to energize the brake lamps 6. At the same time the charging current into the condenser 12 of the time relay 4 flows to the ground via the condenser 12, resistor 15', base 16 of transistor 19, and emitter 18 of the transistor 19. Since the charging current into the condenser 12 thus flows as the base current of the transistor 19, electrical conduction is established between the collector 17 and the emitter 18, i.e., the circuit between them is closed, forming a grounded circuit of the flasher unit 5. Through the action of the flasher unit 5, the brake lamps 6 is intermittently flashed. After a lapse of the predetermined time (for instance, 1–2 seconds) the base current of the transistor 19 diminishes with progress of the charge into the condenser 12 and as a result the internal resistance of the transistor 19, i.e., the resistance between collector 17 and emitter 18 increases and thereby the current of collector 17, i.e., the exciting current in the magnet coils 8, 9 of the flasher unit 5 diminishes to halt the action of said flasher unit 5 and restore the normal energized condition of the brake lamps 6. After the brake is released, the brake lamp switch 3 opens to deenergize the brake lamps 6. At the same time the electric charge charged in the condenser 12 leaves the condenser 12, being swiftly discharged therefrom via the circuit of normally closed contact 7 of flasher unit 5, brake lamps 6, ground, diode 14, resistor 15 and condenser 12.

Referring to FIG. 3, this embodiment of the present invention illustrates another variation of the time relay 4 of the preceding two embodiments. The time relay 4 in this embodiment is composed of a magnet relay 20 and a bimetal switch 24. The magnet relay 20 is connected between the brake lamp switch 3 and the normally closed contact 7 of flasher unit 5. In this relay, 21 is a normally closed contact, 22 is a normally open contact and 23 is a magnet coil. In the bimetal switch 24, 25 is a heater, and 26 is a normally open contact. The magnet relay 20 contains two circuits including the normally closed contact 21 and the normally open contact 22. The normally open contact 22 is connected in series to a relay coil 23 which serves to attract the movable piece of the normally closed contact 21 to the normally open circuit 22. The normally closed contact 22 is connected in series to the heater 25 of the heater switch 24 while the magnet coils 8 and 9 are connected between the normally closed contact 21 and the heater 25 for supplying power to the flasher unit 5. Meanwhile, one contact 27 of the normally open contact 26 of the bimetal switch 24 is connected to the relay coil 23 of the magnet relay 20 while the other contact 28 of the normally open contact 26 is connected between the brake lamps 6 and the normally closed contact 7 of the flasher unit 5.

The function of the third embodiment of this invention is as follows. When brake pedal action closes the brake lamp switch 3 and the heater 25 of the heater switch 24 begins to be heated on account of the normally closed contact 21 of the magnet relay 20 being closed, the flasher unit 5 starts the same action as in the preceding two embodiments, that is, to flash the brake lamp 6 intermittently. The flashing of the brake lamps 6 continues intermittently until the normally open contact 26 of the bimetal switch 24 is closed by being heated by the heater 25. With the closing of the normally open contact 26, the relay coil 23 of the magnet relay 20 is excited to attract the movable piece of the normally closed contact 21 to the normally open contact 22. Thus, the power supply to the flasher unit 5 is cut off, halting the action of the flasher unit 5 and restoring the normal energized condition of the brake lamps 6. In this case, the power supply to the heater 25 of the heater switch as well as to the flasher unit 5 is cut off, cooling the heater 25 and restoring the open condition of the normally open contact 26 of the bimetal switch 24. The action of the magnet relay 20, however, even after the opening of the normally open contact 26 of the bimetal switch 24, continues by the self-holding circuit formed by the closing of the normally open contact 22. Accordingly, the relay coil 23 of the magnet relay 20 holds normally open contact 22 closed, while the normally closed contact 21 is open.

As described above, according to the present invention a brake lamp circuit includes the time relay 4 and the flasher unit 5 constituting a separate circuit from the brake lamp power supply circuit, of which the conventional one consists. This separate circuit can be attached to or detached from the universal brake lamp circuit depending upon the need. Thus, the brake lamp circuit according to the present invention can continue to display the braked condition by the brake lamps 6 just as well as the conventional universal brake lamp circuit, even if the time relay 4 and the flasher unit 5 in the separate circuit do not function properly. This is very useful from the standpoint of safe driving.

Though the above embodiments use a condenser type flasher unit 5, any other type of flasher unit will give the same effect.

What is claimed is:

1. In a brake lamp circuit for operating an automobile brake lamp, the circuit including a power source connected to a brake lamp with a brake switch operable by brake pedal action connected in a series circuit with the power source and the brake lamp, and a flasher connected to the brake switch and having normally closed contacts in said series circuit for causing the brake lamp to flash for a few seconds whenever the brake pedal is depressed and then light uninterruptedly during the remainder of the braking period, the improvement comprising a capacitor charging time-delay relay connected to said series circuit between the brake switch and the flasher, the relay including a coil and a capacitor connected in series and having a normally open switch connected to the flasher whereby when the brake pedal is depressed the capacitor is charged, the coil is energized and the normally open switch is closed to activate the flasher, and when the capacitor is fully charged the coil is de-energized and the normally open switch returns to its open position to disable the flasher, and the brake lamp circuit also including a discharge circuit between the capacitor and the brake switch for rapidly discharging the capacitor whenever the brake switch is opened.

2. In a brake lamp circuit for operating an automobile brake lamp, the circuit including a power source connected to a brake lamp with a brake switch operable by brake pedal action connected in a series circuit with the power source and the brake and lamp, and a flasher connected to the brake switch and having normally closed contacts in said series circuit for causing the brake lamp to flash for a few seconds whenever the brake pedal is depressed and then light uninterruptedly during the remainder of the braking period, the improvement comprising a capacitor charging time-delay switching means connected to said series circuit connected between the brake switch and the flasher, the switching means including a transistor having its base connected through a capacitor to said series circuit between the brake switch and the flasher and having its emitter-collector circuit connected to the flasher whereby when the brake pedal is depressed the capacitor is charged and the collector and emitter of the transistor close the circuit to the flasher to activate the flasher, and when the capacitor is fully charged the collector and emitter of the transistor open the circuit to the flasher to disable the flasher, and the brake lamp circuit also including a discharge circuit for the capacitor for rapidly discharging the capacitor whenever the brake switch is opened.

* * * * *